June 10, 1930.                J. F. WOVERIS                    1,763,206
                             UNIVERSAL JOINT
                           Filed July 3, 1929
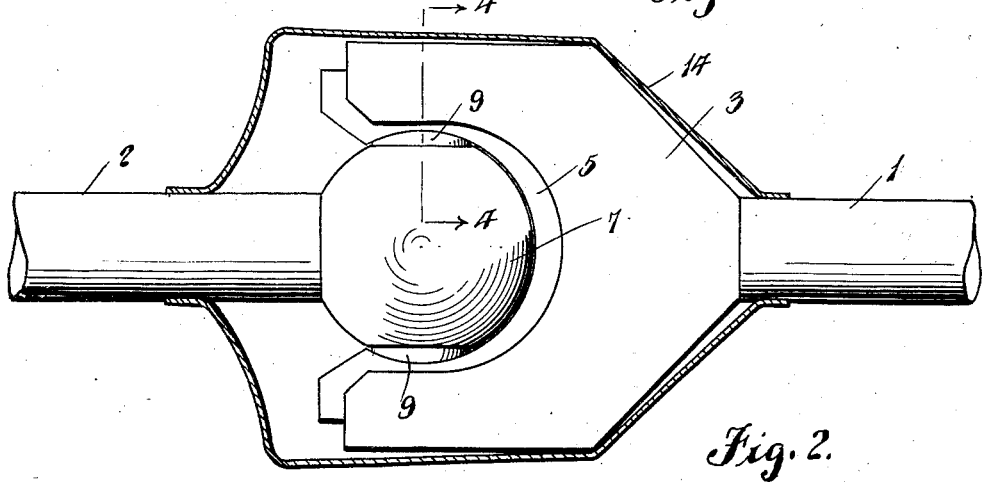
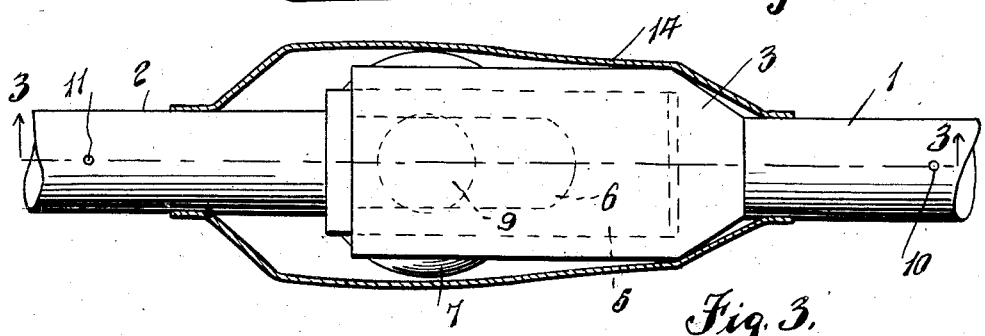
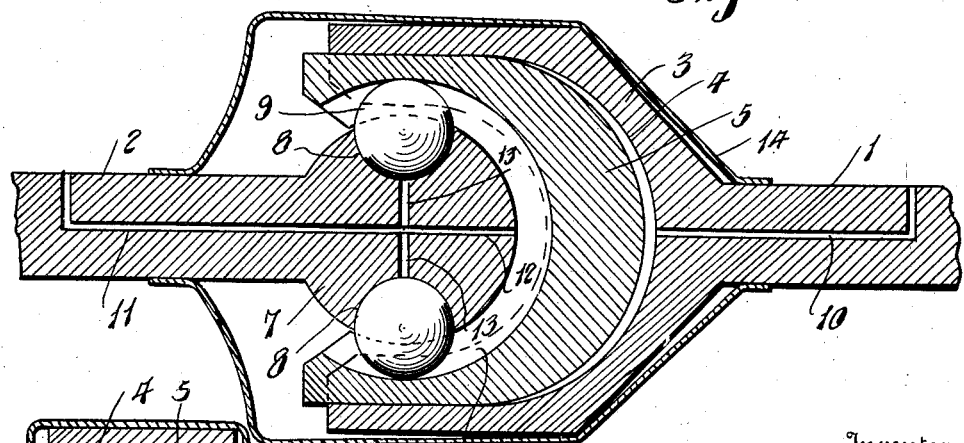
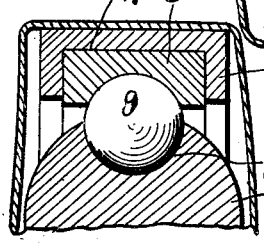
Inventor
J. F. Woveris.
By L. F. Randolph Jr.
Attorney Patented June 10, 1930

1,763,206

UNITED STATES PATENT OFFICE

JOSEPH F. WOVERIS, OF CHICAGO, ILLINOIS

UNIVERSAL JOINT

Application filed July 3, 1929. Serial No. 375,700.

The invention relates to universal joints for drive shafts of automobiles and the like, and has for its object the provision of a joint that is so constructed as to a large extent to eliminate friction in the action of the joint, and also provides means by which a slide adjustment of the joined shaft may be automatically secured without the intervention of splining one of the shafts.

A further object of the invention is the provision of a universal joint employing a head on one shaft member having a U-shaped grooved guide to receive a U-shaped bearing member, said bearing member being provided with an arcuate raceway that is in length greater than one-half of a circle, and providing the other shaft with a head having semi-spherical recesses to receive spherical bearing members that travel in the raceway, the U-shaped bearing member having sliding engagement with the head on which it is mounted so as to permit thrust adjustment of the shaft during operation.

The invention will be described in detail hereinafter and will be found illustrated in the accompanying drawings, in which Figure 1 is a plan view of a universal joint the connected shafts being shown fragmentarily, and the flexible cover being shown in section, Figure 2 is a side view of the parts shown in Figure 1, the cover being shown in section, Figure 3 is a longitudinal sectional view on a plane indicated by the line 3—3 of Figure 2, and Figure 4 is a transverse sectional detail on a plane indicated by the line 4—4 of Figure 1.

In the drawings similar reference characters are used to designate corresponding parts throughout the several views.

1 and 2 indicate the two sections of a drive shaft. Formed integral with the shaft 1 is a U-shaped head member 3 that is provided with a U-shaped grooved guide 4 in which is slidably mounted a bearing member 5 and having an arcuate raceway groove 6 therein, said raceway being in length greater than a half of a circle. The shaft member 2 has a head 7 thereon that is preferably spherical as shown and provided with semi-spherical recesses 8 to receive spherical bearing members 9 that travel in the raceway 6 when the joint is assembled as shown in the drawings. 10 indicates an oil conduit for supplying a lubricant to the grooved guide 4, 11 a similar conduit in the shaft section 2 having an extension 12 for conveying lubricant to the raceway 6 and transverse connection 13 for lubricating the bearing of the members 9 in the recesses 8. 14 indicates a flexible covering for the joint, said cover 14 being of any suitable flexible material such for instance as leather, oil-proof fabric, and the like.

It will be apparent that in operation the joint will be practically frictionless and for that reason will be substantially indestructible from wear, and as stated the slip connection between the bearing member 5 and the head 3 in the guide groove 4 will permit thrust adjustment of the two shaft members relatively to one another.

What is claimed is:—

1. A universal joint, comprising two shafts, one of said shafts having a head provided with a U-shaped grooved guideway, a U-shaped bearing member slidably mounted in said grooved guideway and having an arcuate raceway therein, the other of said shafts having a head thereon provided with spherical recesses therein, and spherical bearing members engaged in said recesses and in the raceway aforesaid.

2. A universal joint, comprising two shafts, one of said shafts having a head thereon provided with a U-shaped guideway, a U-shaped bearing member slidably mounted in said grooved guideway and having an arcuate raceway therein, said raceway being more than 180° in length, the other of said shafts having a head thereon provided with oppositely disposed spherical recesses therein, and spherical bearing members engaged in said recesses and in the raceway aforesaid.

In testimony whereof I affix my signature.

JOSEPH F. WOVERIS.